(12) United States Patent
Braun

(10) Patent No.: US 9,683,608 B2
(45) Date of Patent: Jun. 20, 2017

(54) UNIVERSAL JOINT BEARING, JOINT CROSS, UNIVERSAL JOINT, AND MULTI-ROW NEEDLE ROLLER BEARING

(71) Applicant: Christoph Braun, Bad Königshofen (DE)

(72) Inventor: Christoph Braun, Bad Königshofen (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/755,231

(22) Filed: Jun. 30, 2015

(65) Prior Publication Data

US 2015/0377302 A1    Dec. 31, 2015

(30) Foreign Application Priority Data

Jun. 30, 2014 (DE) .................. 10 2014 212 578

(51) Int. Cl.
| | |
|---|---|
| *F16D 3/41* | (2006.01) |
| *F16D 3/38* | (2006.01) |
| *F16C 19/46* | (2006.01) |
| *F16C 19/48* | (2006.01) |

(52) U.S. Cl.
CPC ............ *F16D 3/385* (2013.01); *F16C 19/466* (2013.01); *F16C 19/48* (2013.01); *F16D 3/41* (2013.01)

(58) Field of Classification Search
CPC ........ F16C 19/28; F16C 19/38; F16C 19/466; F16C 19/48; F16D 3/385; F16D 3/41
USPC .................................................. 464/132, 136
See application file for complete search history.

(56) References Cited

U.S. PATENT DOCUMENTS

| | | | | |
|---|---|---|---|---|
| 792,559 | A | * | 6/1905 | Stechbarth .............. F16C 19/48 |
| 4,436,516 | A | * | 3/1984 | Olschewski ............ F16C 19/28 |
| | | | | 464/132 X |
| 8,764,306 | B2 | * | 7/2014 | Friedrich .............. F16C 33/485 |

FOREIGN PATENT DOCUMENTS

| | | | |
|---|---|---|---|
| DE | 10 2008 032 027 A1 | * | 1/2010 |
| GB | 832784 | * | 4/1960 .................... 464/132 |

* cited by examiner

*Primary Examiner* — Gregory Binda
(74) *Attorney, Agent, or Firm* — Bryan Peckjian; SKF USA Inc. Patent Dept.

(57) ABSTRACT

A universal joint bearing for a joint cross of a universal joint includes a hollow cylindrical body having a longitudinal axis and a base in an end region of the body, at least one first needle roller set including a first plurality of rollers inside the cylindrical body and at least one second needle roller set including a second plurality of rollers inside the cylindrical body. The first needle roller set is disposed adjacent to the second needle roller set in a direction of the longitudinal axis, and at least one of the first plurality of rollers is longer than at least one of the second plurality of rollers.

4 Claims, 1 Drawing Sheet

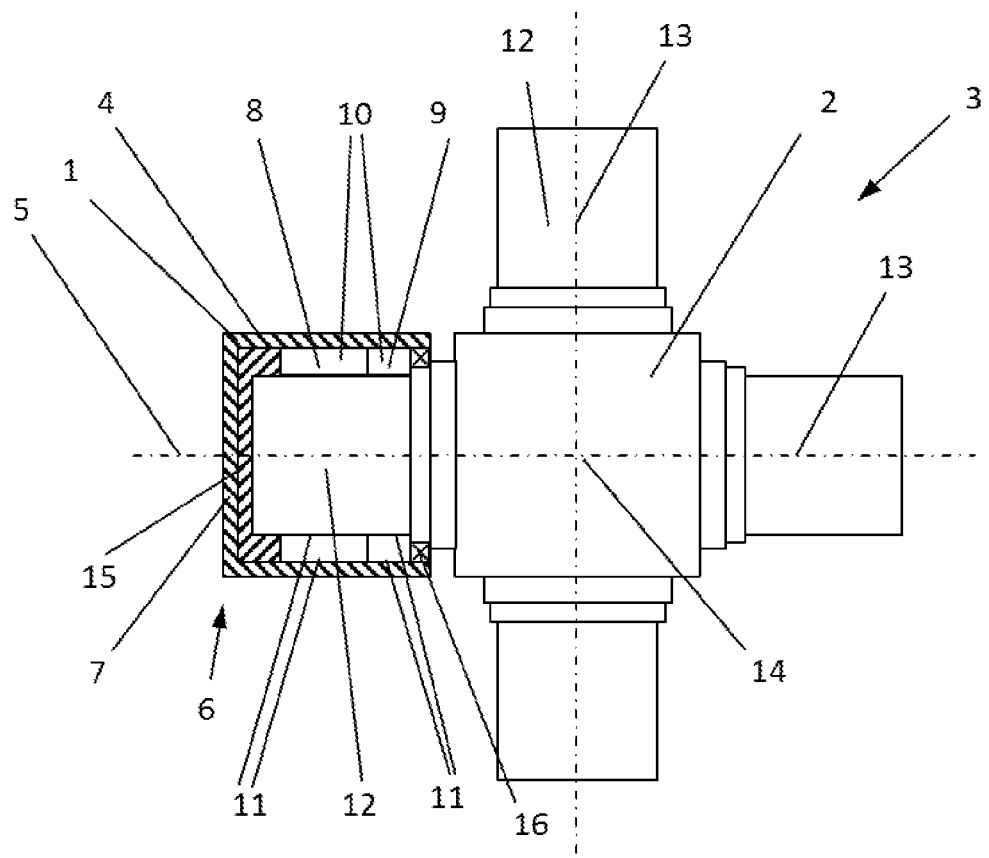

UNIVERSAL JOINT BEARING, JOINT CROSS, UNIVERSAL JOINT, AND MULTI-ROW NEEDLE ROLLER BEARING

CROSS-REFERENCE

This application claims priority to German patent application no. 10 2014 212 578.2 filed on Jun. 30, 2014, the contents of which are fully incorporated herein by reference.

TECHNOLOGICAL FIELD

Exemplary embodiments of the disclosure relate to a universal joint bearing for a joint cross of a universal joint that has a longitudinal axis and a multi-row needle roller set disposed therein. The multi-row needle roller set includes at least two needle roller sets disposed adjacent to each other in the direction of the longitudinal axis. Exemplary embodiments further relate to a joint cross for a universal joint as well as a universal joint including an inventive universal joint bearing.

BACKGROUND

Universal joints are connecting elements that may be used for connecting two shafts that are rotatable about their respective longitudinal axes, especially when their longitudinal axes are not aligned relative to each other or are pivotable relative to each other. Universal joints include a central joint cross with four pins pointing away from one another. The pins are disposed in pairs on two orthogonal axes and are connected to one another by an end that points towards the center of the joint cross. Pairs of pins disposed on a common axis are each connectable to a fork-shaped end of a shaft so that the shaft can pivot about the common axis of the respective pair of pins. To improve this pivotability the pins include universal joint bearings which bearings are generally supported on the pins by a rolling-element bearing. Since universal joint bearings are primarily subjected to forces in the radial direction, needle roller bearings that include a plurality of needle rollers are often used. To reduce contact stress peaks during high deformations, many universal joint bearings include multi-row rolling-element sets that have, for example, two adjacently disposed needle rollers having the same length.

Known universal joint bearings with multi-row rolling element sets all have a common disadvantage. Specifically, needle rollers of different lengths must be provided for universal joint bearings that have different lengths. This results in increased storage expense and handling expense and increased manufacturing costs in addition to increased procurement costs.

SUMMARY

One aspect of the present disclosure is therefore to provide a universal joint bearing as well as a joint cross, a universal joint, and a multi-row needle roller bearing which at least partly overcome the above-mentioned disadvantages. It is the object of the present disclosure in particular to provide a universal joint bearing (as well as a joint cross, a universal joint, and a multi-row needle roller bearing) that requires only a small variety of elements in order to produce universal joint bearings with different widths.

This is achieved by a universal joint bearing for a joint cross of a universal joint that has a cylindrical body with a longitudinal axis and a base in an end region of the body. The universal joint bearing includes at least one first needle roller set and one second needle roller set inside the cylindrical body, each needle roller set including a plurality of needle rollers. The first needle roller set is disposed adjacent to the second needle roller set in the direction of the longitudinal axis. At least some of the needle rollers of the first needle roller set are longer than some of the needle rollers of the second needle roller set. This arrangement has the advantage that a larger number of universal joint bearings having different widths is manufacturable using a predetermined number of needle roller sets having different widths than using an arrangement in which all needle rollers of the needle roller set have the same width. To date, using needle roller sets having lengths A, B, C, and D, only double row universal joint bearings having lengths 2×A, 2×B, 2×C, and 2×D have been manufacturable. According to the present disclosure, double row universal joint bearings having lengths A+B, A+C, A+D, B+C, B+D, and C+D are also achievable. In other words, instead of only 4 different lengths, using the available number of needle rollers having different lengths a further 6 different lengths of multi-row needle roller bearings can be manufactured.

In one embodiment of the disclosure all needle rollers of a given needle roller set have the same length. Such needle roller sets are easier to install than needle roller sets that include needle rollers with different lengths. This is because the needle rollers of the different needle roller sets can be disposed flush against one another, and adjacent needle rollers are not staggered with respect to one another.

In some exemplary embodiments the first needle roller set is disposed between the base of the universal joint bearing and the second needle roller set. Thus the longer needle rollers are disposed closer to the base of the universal joint bearing than the shorter needle rollers. In this embodiment, when the universal joint bearings are disposed on a joint cross, the needle roller sets including the longer needle rollers are spaced farther from one another than the needle roller sets having the shorter needle rollers.

In an alternative embodiment the second needle roller set is disposed between the base of the universal joint bearing and the first needle roller set. In this alternative embodiment the shorter needle rollers are disposed closer to the base of the universal joint bearing than the longer needle rollers. In this alternative embodiment, when the universal joint bearings are disposed on a joint cross the needle roller sets including the shorter needle rollers are spaced farther from one another than the needle roller sets having the longer needle rollers.

In some exemplary embodiments the first needle roller set and the second needle roller set include a common cage for the needle rollers. In this way the needle roller pairs are connectable into a combined subassembly and subsequently installable with the universal joint bearing.

In some exemplary embodiments the body includes in its interior a bearing outer ring including a running surface for the needle rollers, and the bearing outer ring is disposed between the body and the needle roller sets. Such a running surface helps ensure uniform rolling of the needle rollers on the bearing outer ring and thus reduces wear of the universal joint bearing. Furthermore, the running surface provides lateral guidance for the needle rollers.

In some further exemplary embodiments the body and bearing outer ring are formed one-part. This has the advantage that the number of parts to be installed is reduced. Furthermore, the loadability of the universal joint bearing is increased.

In a further embodiment the body includes in its interior a bearing inner ring having a running surface for the needle rollers, and the needle roller sets are disposed between the body and the bearing inner ring. This can result in a completely pre-assembled universal joint bearing that is installable on a corresponding joint cross.

In a further embodiment the bearing inner ring is an integral component of a joint cross. In such an alternative embodiment the needle roller sets are installed directly on the bearing inner ring of the joint cross. This alternative embodiment can reduce the number of parts to be installed.

The disclosed joint cross for a universal joint includes four pins pointing away from one another. The four pins are disposed in pairs on two orthogonal joint axes of the joint cross and are connected to each other by an end. The pins are substantially cylindrical, and at least one pin includes a universal joint bearing according to the present disclosure.

In addition, a universal joint including a joint cross, in which at least one pin of the joint cross includes a universal joint bearing according to the present disclosure is disclosed.

Furthermore, a multi-row needle roller bearing including at least one first needle roller set and one second needle roller set, where the first needle roller set and the second needle roller set each include a plurality of needle rollers and where the multi-row needle roller bearing includes needle rollers having different lengths is disclosed.

BRIEF DESCRIPTION OF THE DRAWING

In the following the invention shall be explained in more detail with reference to a drawing.

FIG. 1 is a schematic side elevational view, partly in section, of a universal joint including a joint cross and a universal joint bearing according to the present disclosure disposed on the joint cross.

DETAILED DESCRIPTION

The universal joint 3 schematically depicted in FIG. 1 includes a joint cross 2 with four pins 12. The four pins 12 each have a circular cross-sectional surface and are connected to one another by the center 14 of the joint cross 2. Each set of two pins 12 is disposed on a common joint axis 13, and the two joint axes 13 are disposed at right angles to each other.

A universal joint bearing 1 according to an exemplary embodiment is disposed on a pin 12 pointing towards the left in the Figure. The universal joint bearing 1 includes a hollow cylindrical body 4 that includes a base 7 in an end region 6 facing away from the center 14 of the joint cross 2. The universal joint bearing has a longitudinal axis 5, which in the depicted, installed state coincides with the joint axis 13.

A first needle roller set 8 and a second needle roller set 9 are disposed adjacent to each other between the body 4 and the pin 12, and the first needle roller set 8 is disposed between the second needle roller set 9 and the base 7. The first needle roller set 8 and the second needle roller set 9 include a plurality of needle rollers 10 that are uniformly distributed about the circumference of the pin 12.

An intermediate piece 15 is disposed between the base 7 and the first needle roller set 8 in order to adapt a total length of the first needle roller set 8 and the second needle roller set 9 to a length of the universal joint bearing 1. The intermediate piece thus prevents axial shifting of the needle rollers 10 along the longitudinal axis 5. The intermediate piece 15 is disc-shaped and includes an annular projection on the side facing the center 14 of the joint cross 2. In an alternative embodiment (not illustrated) the intermediate piece 15 is completely annular. A seal ring 16 is disposed between the second needle roller set 9 and a shoulder of the joint cross 2 in order to protect the first needle roller set 8 and the second needle roller set 9 from environmental influences.

As can be clearly seen in FIG. 1, the needle rollers 10 of the first needle roller set 8 have a greater length than the needle rollers 10 of the second needle roller set 9. In order to ensure a uniform rolling of the needle rollers 10, the pins 12 and an inner side of the body 4 of the universal joint bearing 1 each include an encircling running surface 11 for the needle rollers 10.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved universal joints and universal joint bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Universal joint bearing
2 Joint cross
3 Universal joint
4 Body
5 Longitudinal axis
6 End region
7 Base
8 First needle roller set
9 Second needle roller set
10 Needle roller
11 Running surface
12 Pins
13 Joint axis
14 Center
15 Intermediate piece
16 Seal ring

What is claimed is:

1. A combination of a universal joint bearing and a pin of a joint cross of a universal joint, the combination comprising:

the pin having an outer cylindrical surface which when viewed in axial cross section has an axially extending outer surface which forms a pin running surface, the pin having a pin axial end that is opposite from where the pin is configured to engage the joint cross;

a cylindrical body positioned over the pin and having a longitudinal axis and a base in an end region of the body, the cylindrical body defining a hollow therein which has a cylindrical shape such that when viewed in axial cross section the cylindrical body has a radially extending inner surface which forms an axial end of the hollow and has an axially extending inner surface which forms a cylindrical body running surface;

an intermediate piece positioned adjacent the axial end of the hollow and sandwiched between the axial end of the hollow and the pin axial end;

the intermediate piece further comprising an annular projection along a periphery thereof that extends away from the axial end of the hollow to form a radially extending projection axial end when viewed in axial cross section;

at least one first needle roller set comprising a first plurality of rollers inside the cylindrical body;

at least one second needle roller set comprising a second plurality of rollers inside the cylindrical body, the first needle roller set is disposed adjacent to the second needle roller set in a direction of the longitudinal axis, at least one of the first plurality of rollers is longer than at least one of the second plurality of rollers; and wherein the first plurality of rollers and the second plurality of rollers have the same diameter and and are configured to run along the pin running surface and the cylindrical body running surface, the radially extending projection axial end being axially adjacent to one of the first plurality of rollers and the second plurality of rollers.

2. The combination of claim 1,
wherein each of the first plurality of rollers has a first length and each of the second plurality of rollers has a second length different than the first length.

3. The combination of claim 1,
wherein the first needle roller set is disposed between the base of the universal joint bearing and the second needle roller set.

4. A joint cross for a universal joint, the joint cross including four pins connected to and pointing away from a joint center, the pins being disposed in pairs on two orthogonal joint axes of the joint cross, wherein the four pins are substantially cylindrical, and
wherein at least one of the four pins further comprises:
an outer cylindrical surface which when viewed in axial cross section has an axially extending outer surface which forms a pin running surface, the at least one of the four pins having a pin axial end that is opposite from where the at least one of the four pins is configured to engage the joint cross;

a cylindrical body positioned over the at least one of the four pins and having a longitudinal axis and a base in an end region of the cyldindrical body, the cylindrical body defining a hollow therein which has a cylindrical shape such that when viewed in axial cross section the cylindrical body has a radially extending inner surface which forms an axial end of the hollow and has an axially extending inner surface which forms a cylindrical body running surface;

an intermediate piece positioned adjacent the axial end of the hollow and sandwiched between the axial end of the hollow and the pin axial end;

the intermediate piece further comprising an annular projection along a periphery thereof that extends away from the axial end of the hollow to form a radially extending projection axial end when viewed in axial cross section;

at least one first needle roller set comprising a first plurality of rollers inside the cylindrical body;

at least one second needle roller set comprising a second plurality of rollers inside the cylindrical body, the first needle roller set is disposed adjacent to the second needle roller set in a direction of the longitudinal axis, at least one of the first plurality of rollers is longer than at least one of the second plurality of rollers; and wherein the first plurality of rollers and the second plurality of rollers have the same diameter and and are configured to run along the pin running surface and the cylindrical body running surface, the radially extending projection axial end being axially adjacent to one of the first plurality of rollers and the second plurality of rollers.

* * * * *